United States Patent
Kim et al.

(10) Patent No.: US 9,781,275 B2
(45) Date of Patent: Oct. 3, 2017

(54) MOBILE TERMINAL AND METHOD OF CONTROLLING THE SAME

(71) Applicant: LG ELECTRONICS INC., Seoul (KR)

(72) Inventors: Dongik Kim, Seoul (KR); Namyoung Kim, Seoul (KR); Sunho Cho, Seoul (KR); Dongjun Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/514,599

(22) PCT Filed: Sep. 16, 2015

(86) PCT No.: PCT/KR2015/009714
§ 371 (c)(1),
(2) Date: Mar. 27, 2017

(87) PCT Pub. No.: WO2016/052889
PCT Pub. Date: Apr. 7, 2016

(65) Prior Publication Data
US 2017/0230511 A1    Aug. 10, 2017

(30) Foreign Application Priority Data

Sep. 29, 2014 (KR) .................. 10-2014-0130423
Sep. 29, 2014 (KR) .................. 10-2014-0130424

(51) Int. Cl.
*H04M 3/00* (2006.01)
*H04M 11/00* (2006.01)
*H04L 12/28* (2006.01)

(52) U.S. Cl.
CPC ....... *H04M 11/007* (2013.01); *H04L 12/2803* (2013.01)

(58) Field of Classification Search
CPC ......... H04M 1/72522; H04M 1/72525; H04M 2207/18; H04M 3/42178; H04M 1/7253;
(Continued)

(56) References Cited

U.S. PATENT DOCUMENTS 7,649,456 B2 * 1/2010 Wakefield ............. G01S 5/0252
340/12.53
7,869,824 B2 * 1/2011 Min ....................... G08C 17/02
455/418

(Continued)

FOREIGN PATENT DOCUMENTS

EP    2 498 234 A1    9/2012

*Primary Examiner* — Babar Sarwar
(74) *Attorney, Agent, or Firm* — Birch, Stewart, Kolasch & Birch, LLP

(57) ABSTRACT

Provided is a mobile terminal including: a display unit to which an execution screen of an application for controlling at least one electronic apparatus is output; a memory unit in which at least one piece of operation command information relating to the electronic apparatus is stored; and a controller that generates an operation command for which at least one condition for a control command relating to driving of the electronic apparatus is set, based on a user input that is applied to the execution screen, in which the controller determines whether or not the stored operation command and the generated operation command form a loop, and in which, in a case where a result of the determination is that multiple operation commands including the generated operation command form the loop, the controller determines whether or not the generated operation command is stored in the memory unit.

14 Claims, 15 Drawing Sheets

(58) Field of Classification Search
CPC ... H04M 11/007; H04W 24/02; H04W 8/245; H04W 8/265; G08C 17/02; H04L 12/2803
USPC ..... 455/412.1–414.2, 418–422.1, 41.1–41.2, 455/552.1, 456.1, 456.2, 457
See application file for complete search history.

(56) References Cited

U.S. PATENT DOCUMENTS

| | | | |
|---|---|---|---|
| 8,548,523 B2 * | 10/2013 | Belz | H04M 19/04 455/552.1 |
| 8,577,392 B1 * | 11/2013 | Pai | H04L 67/18 455/404.2 |
| 8,868,220 B2 * | 10/2014 | Crucs | G05B 11/01 455/353 |
| 9,509,763 B2 * | 11/2016 | Canoy | H04L 67/10 |
| 2003/0181992 A1 * | 9/2003 | Lee | G05B 15/02 700/2 |
| 2006/0099971 A1 * | 5/2006 | Staton | G08C 17/00 455/456.6 |
| 2008/0181172 A1 * | 7/2008 | Angelhag | G01S 5/14 370/328 |
| 2012/0276891 A1 * | 11/2012 | Bai | G08C 17/02 455/420 |
| 2013/0090773 A1 * | 4/2013 | Park | H04L 12/12 700/286 |
| 2013/0260320 A1 * | 10/2013 | Townsend | F24C 7/08 431/2 |
| 2013/0304998 A1 | 11/2013 | Palmer | |
| 2014/0167929 A1 * | 6/2014 | Shim | G08C 17/02 340/12.5 |

* cited by examiner

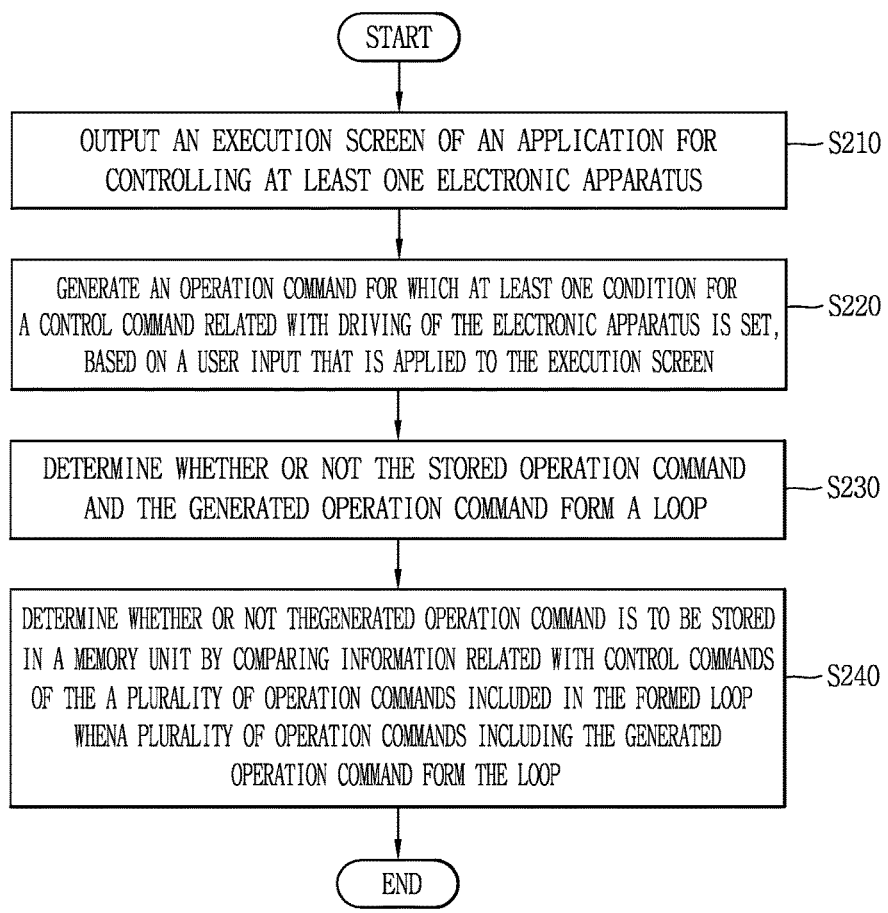

FIG. 3
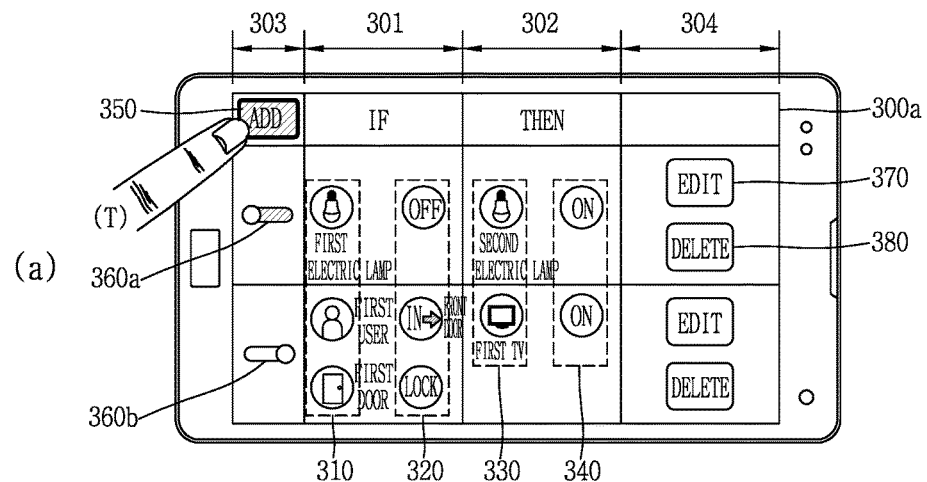
(a)
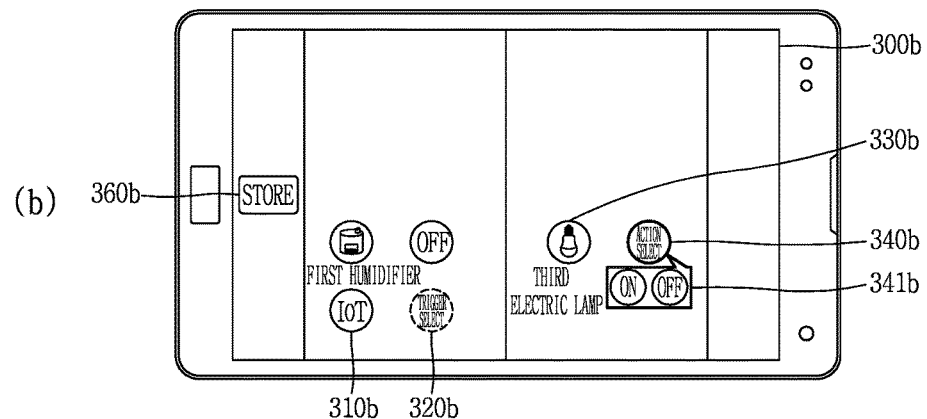
(b)
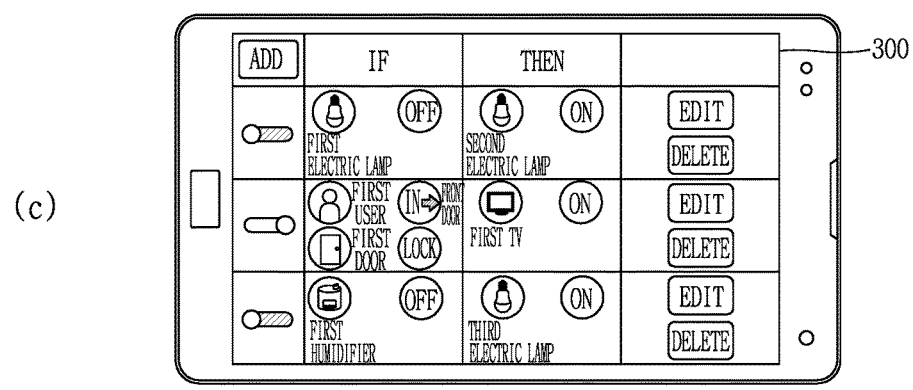
(c)

FIG. 7
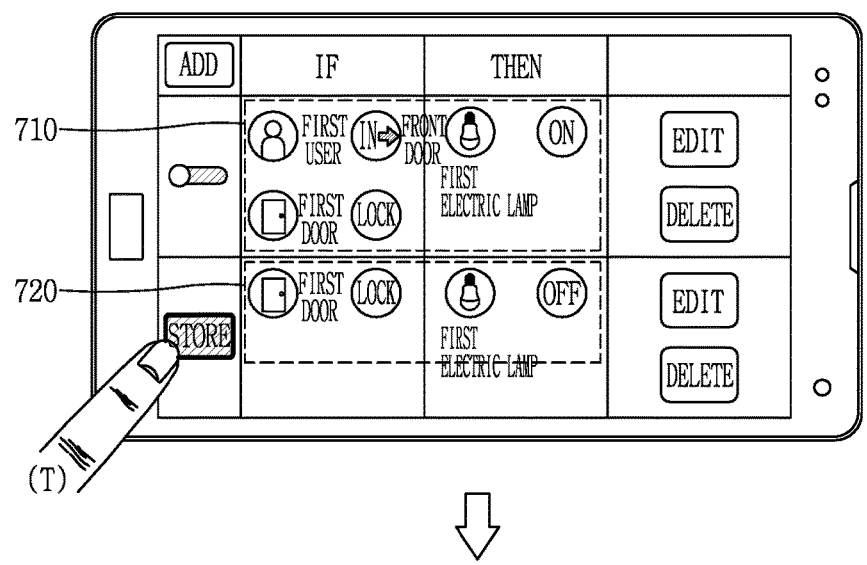
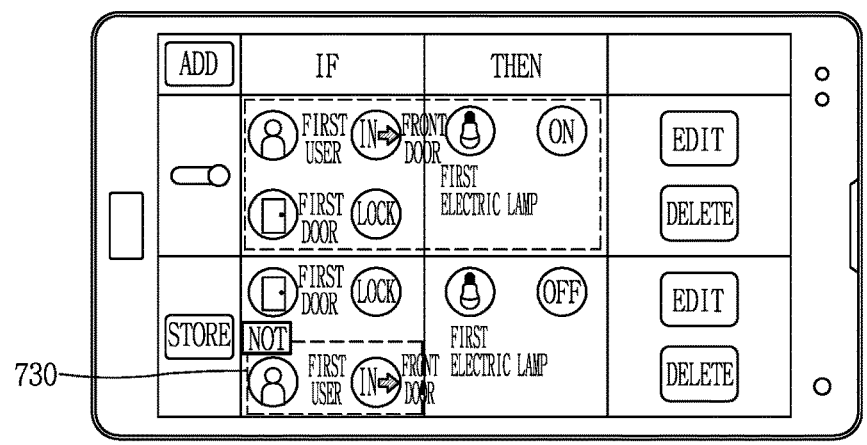

FIG. 10
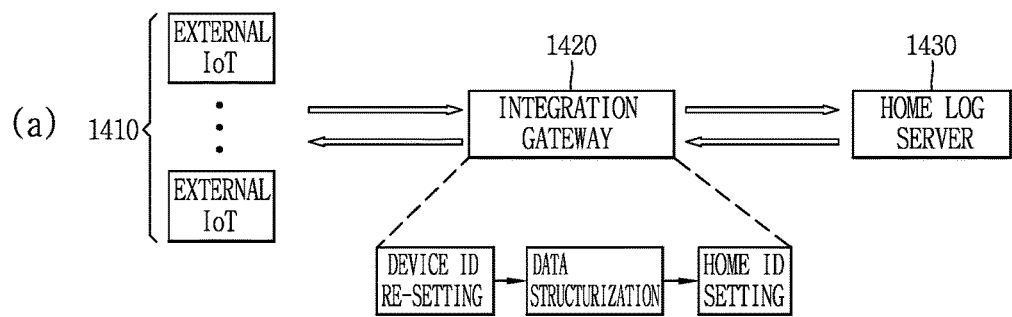
(a)
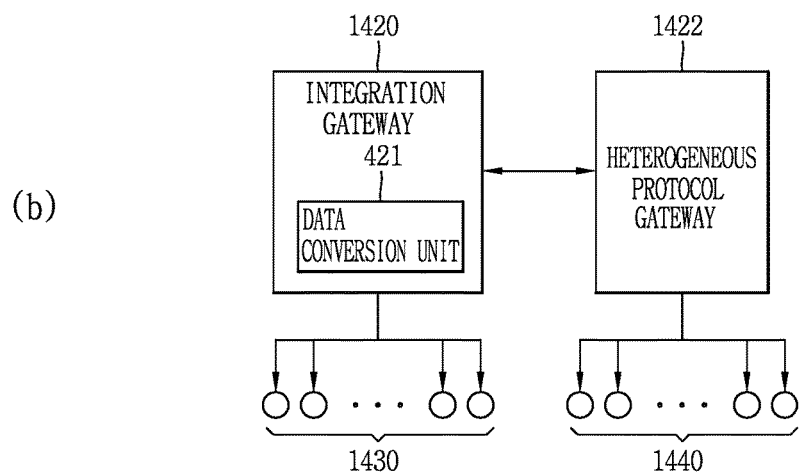
(b)

FIG. 11
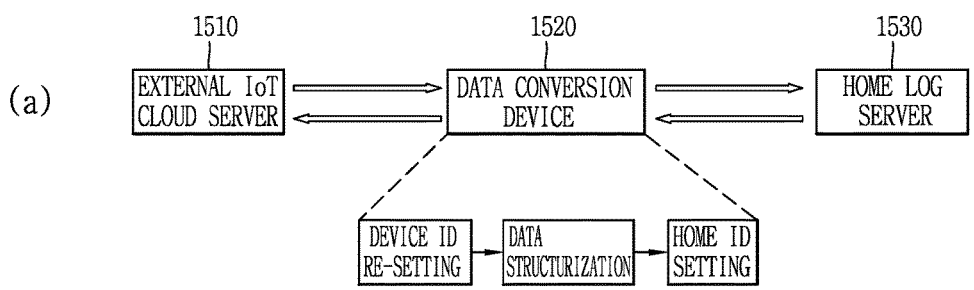
(a)
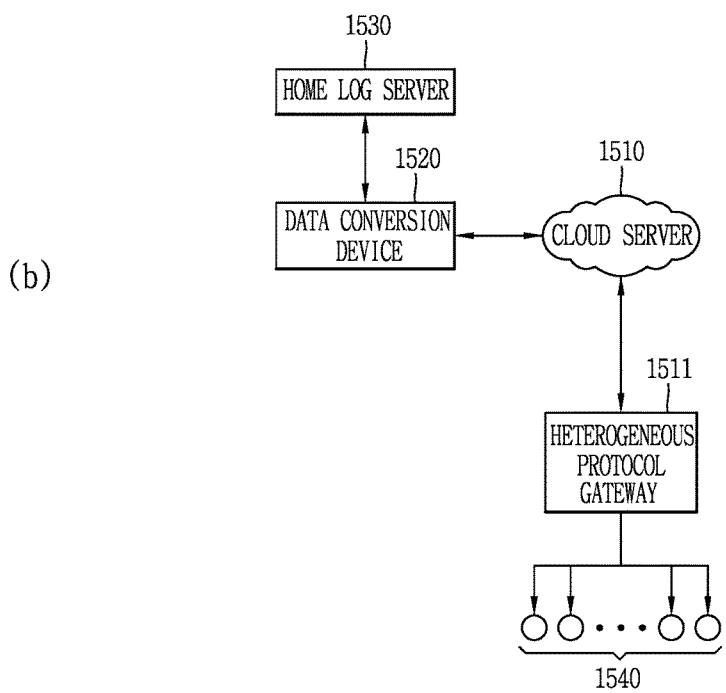
(b)

MOBILE TERMINAL AND METHOD OF CONTROLLING THE SAME

CROSS REFERENCE TO RELATED APPLICATIONS

This application is the National Phase of PCT International Application No. PCT/KR2015/009714, filed on Sep. 16, 2015, which claims priority under 35 U.S.C. 119(a) to Patent Application Nos. 10-2014-0130423 and 10-2014-0130424, filed in the Republic of Korea on Sep. 29, 2014, all of which are hereby expressly incorporated by reference into the present application.

TECHNICAL FIELD

The present disclosure relates to a mobile terminal that controls operation command information relating to driving of an electronic apparatus which is included in a home automation system and a method of controlling the mobile terminal.

In addition, the present invention relates to transmission and reception of data between constituent elements that are included in a home automation system.

BACKGROUND ART

The Internet of Things (IoT) provides an environment in which information is shared by connecting physical objects in real life through wired and wireless networks. That is, the Internet of Things provides connectivity to enable the physical objects to exchange data with an operator or connected devices.

Through the Internet of Things, not only home appliances and electronic apparatuses, but also physical objects in various fields including health care, telemetering, smart home, and a smart car are connected across existing networks for sharing information.

The Internet of Things is similar to existing ubiquitous computing or a Machine-to-Machine (M2M) technology. However, the Internet of Things is expected to offer advanced connectivity of devices, systems, and services that goes beyond the M2M technology that allows both wireless and wired systems to communicate with other devices of the same type, thereby exchanging large amounts of data between other devices.

The Internet of Things is applied to the home automation system. A home automation system communicates with things that are included in the system and controls the things, using the Internet of Things.

In the home automation system that uses the Internet of Things, various attempts have been made to set information relating to driving of the things, which are included in the system, at user's discretion.

Furthermore, in the home automation system that uses the Internet of Things, various attempts have been made to provide compatibility between various network protocols.

DISCLOSURE OF INVENTION

Technical Problem

Therefore, an aspect of the detailed description is to provide a mobile terminal in which information relating to driving of an electronic apparatus or information relating to a condition for the driving of the electronic apparatus is set in order to set an operation command relating to the driving of the electronic apparatus that is included in a home automation system, at user's discretion, and a method of controlling the mobile terminal.

Another aspect of the detailed description is to provide an apparatus that constitutes a home automation system and that enables data communication to perform between constituent elements that uses heterogeneous network protocols, among constituent elements that are included in a home automation system, and a method of controlling the apparatus.

Solution to Problem

To achieve these and other advantages and in accordance with the purpose of the present invention, as embodied and broadly described herein, there is provided a method of controlling a home automation system including: storing attribute information of at least one electronic apparatus that use a first communication protocol in a home automation in which the Internet of Things is set up; causing an electronic apparatus corresponding to the stored attribute information to perform data communication with a wireless communication unit that uses the first communication protocol; causing a data conversion device to transmit a data request message to make a request for data that is received by the wireless communication unit, subsequent to the performing of the data communication; causing the wireless communication unit to transfer the data that is requested, to the data conversion device, in response to the data request message; and causing the data conversion device to convert the received data into data in compliance with a second communication protocol that is different from the first communication protocol.

According to one embodiment, the data conversion device is arranged within the wireless communication unit that uses the second communication protocol, and performs data communication with the wireless communication unit that uses the first communication protocol.

According to one embodiment, the data conversion device performs data communication between an external database that uses the first communication protocol, and the wireless communication unit that uses the second communication protocol.

According to one embodiment, the data conversion device executes a pre-set application and thus transfers data request message to make a request for data that is stored in the external database.

Advantageous Effects of Invention

In a mobile terminal according to one embodiment of the present invention and a method of controlling the mobile terminal, pieces of operation command information for multiple electronic apparatuses that are included in a home automation system are set at user's discretion. Accordingly, user's intention is positively reflected in managing the home automation system.

In addition, with a configuration in which it is determined whether or not operation command information which is generated by a user selection, an error in managing the home automation system is prevented. Thus, stability of the system is improved.

Furthermore, in a home automation system according to one embodiment of the present invention and a method of controlling the home automation system, the data communication with an electronic apparatus that uses various network protocols is performed and thus the generated operation command information is transmitted and received. Accordingly, the network compatibility of the home automation system is improved.

Therefore, a network attribute of an electronic apparatus does not impose any limitation in using the home automation system. Thus, user convenience is increased.

BRIEF DESCRIPTION OF DRAWINGS

FIG. 2 is a flowchart for describing a method of controlling a mobile terminal according to one embodiment of the present invention;

FIG. 3 is diagram for describing an execution screen of an application for controlling an electronic apparatus that is included in the home automation system;

FIG. 7 is diagram for describing the method of controlling the mobile terminal in which, in a case where the generated operation command is stored, the generated operation command is compared with the operation command that is stored in advance, and condition information is added to the generated operation command;

FIGS. 10 and 11 are diagrams for describing a method of performing data communication in the home automation system.

MODE FOR THE INVENTION

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

A home automation system that will be described in the present specification includes at least one electronic apparatus and at least terminal that communicates with each other through a wired or wireless network.

Figure 1A:
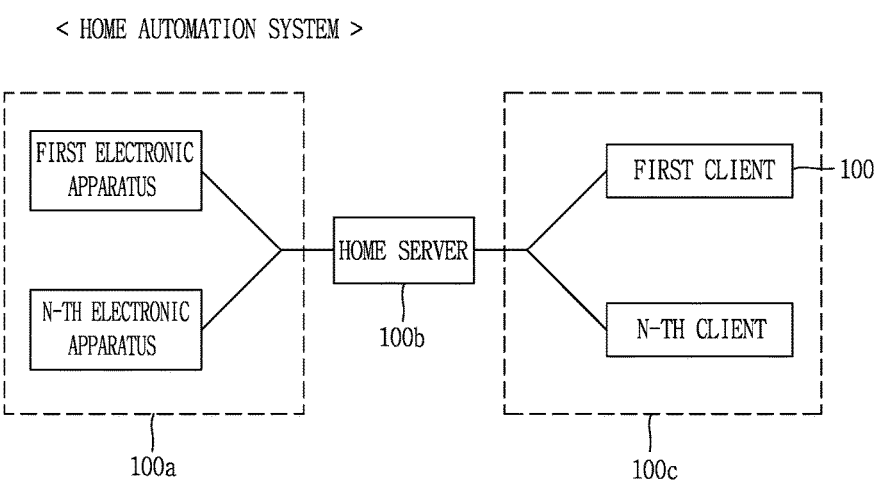
FIG. 1A is a block diagram for describing a home automation system.
Figure 1B:
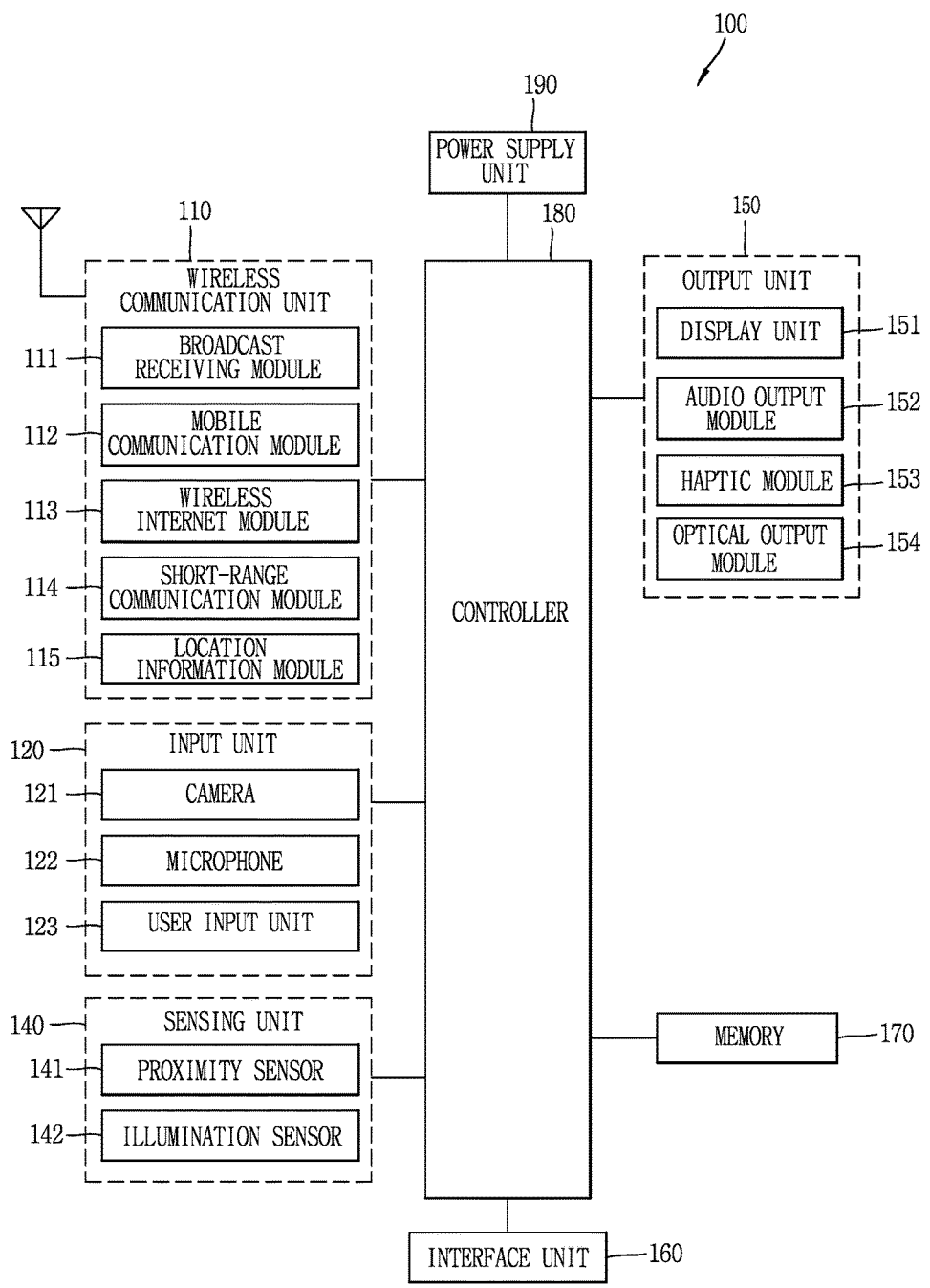
FIG. 1B is a block diagram for describing a mobile terminal relating to the home automation system.
Figure 1C:
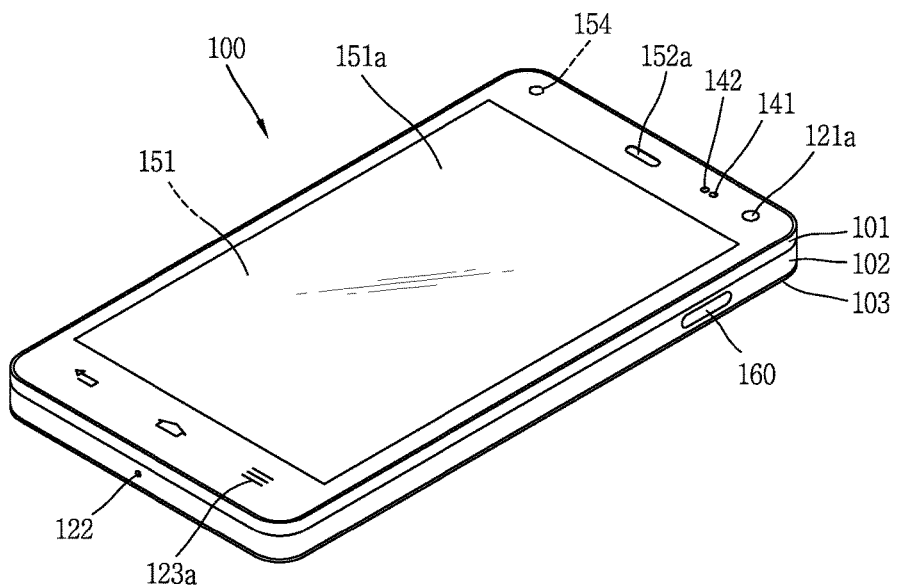
FIGS. 1C and 1D are diagrams of one example of the mobile terminal relating to the home automation system, when viewed from different directions.
Figure 1D:
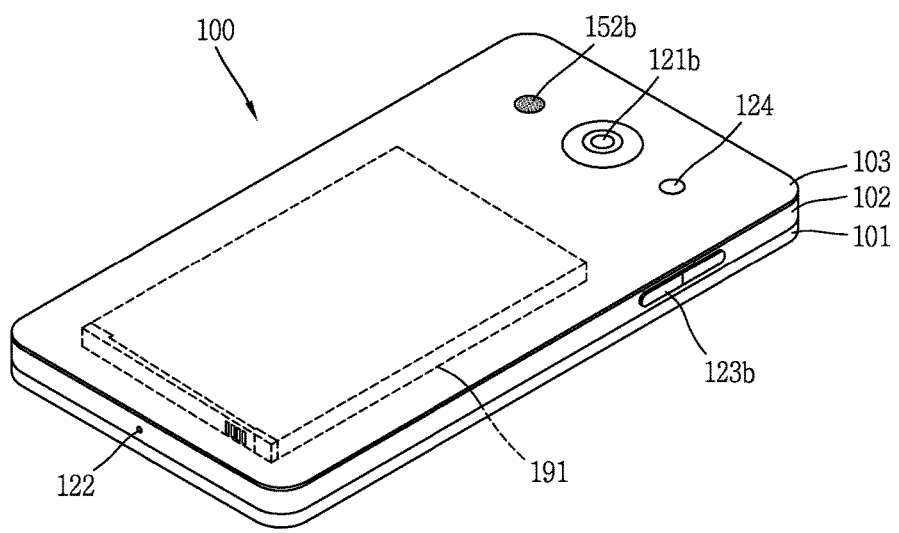

FIG. 1A is a block diagram for describing the home automation system. FIGS. 1B to 1D are diagrams for describing a mobile terminal as one embodiment of a client part that is included in the home automation system.

The home automation system includes a device part $100a$, a network part $100b$, a client part $100c$, and the like. Constituent elements that are illustrated in FIG. 1A are not essential for realizing the home automation system, and the home automation system that will be described in the present specification has more than or less than the constituent elements that are described above.

In addition, the Internet of things is set up in the home automation system that is illustrated in FIG. 1A. That is, at least one constituent element (for example, an electronic apparatus, a mobile terminal, a network device, or the like) that is included in the home automation system stores identification information corresponding to each constituent element. In addition, a server of the home network part $100b$ or a terminal of the client part $100c$ may store identification information of a different constituent element that is included in the home automation system. The identification information is generated based on an IPv4 or IPv6 address.

At least one constituent element communicates with a different constituent element. More specifically, at least one electronic apparatus communicates with at least one of a different electronic apparatus that is included in the device part $100a$ and the home network part $100b$. In addition, at least one terminal that is included in the system communicates with at least one of a different terminal and the home network part $100b$. In this case, the communication uses specific protocols. For example, the specific protocol is among an HTTP, an MQTT, and the like.

In addition, at least one constituent element includes at least one sensor that detects surrounding environment information. For example, the surrounding environment information is at least one among pieces of information relating to a sense of hearing, a sense of taste, a sense of smell, a sense of touch, and a sense of sight. Furthermore, at least one constituent element receives a control signal, processes the received control signal, and thus performs a predetermined function. In this case, the received control signal is transferred by the user of the system.

For example, an electric fan that is included in the home automation system receives a control signal relating to a function such as power-on, power-off, wind direction adjustment, or wind force adjustment. Then, the electric fan processes the received control signal and thus performs at least one of the functions. In this case, the control signal may be one that the user of the system transfers using a mobile terminal, and may be one that a controller which is included in a server transfers based on a pre-set reference.

As described above, in the home automation system in which the Internet of Things is set up, information that is detected by at least one electronic apparatus which is included in the system, and control command information that is set by a client of the system are communicated between the electronic apparatus and the client.

Referring to FIG. 1A, the device part 100a includes at least electronic apparatus. For example, at least one electronic apparatus is among an electric lamp, a humidifier, an electric fan, and the like.

Although not illustrated in FIG. 1A, the electronic apparatus includes at least one among a controller, a communication unit, a sensing unit, an input unit, an output unit, and a memory unit. The controller, the communication unit, the sensing unit, the input unit, the output unit, and the memory unit perform functions similar to those of constituent elements, respectively, of a mobile terminal that will be described in FIGS. 1B to 2C.

That is, identification information corresponding to each electronic apparatus, information relating to a control command for the electronic apparatus, and the like are stored in the memory unit of the electronic apparatus. In addition, the communication unit transfers or receives a control signal relating to driving of the electronic apparatus. The controller controls the driving of the electronic apparatus based on the received control signal.

Furthermore, the controller controls the driving of the electronic apparatus based on pre-set condition information. More specifically, the pre-set condition formation is at least one among information relating to driving of a different electronic apparatus, information relating to a surrounding environment of the system, and information relating to a status of a specific terminal that is included in the client part 100c.

For example, in a case where it is determined that a second electronic apparatus is powered on, a controller of a first electronic apparatus powers on or powers off the first electronic apparatus. In this case, the controller determines whether or not the second electronic apparatus is powered on, based on information relating to a status of the second electronic apparatus, which is received by a communication unit of the first electronic apparatus.

That is, in the home automation system in which the Internet of Things is set up, a controller of an electronic apparatus that is included in the device part 100a controls the driving of the electronic apparatus, in a case where pieces of information relating to driving of a different electronic apparatus, an environment of the system, and a status of a client are evaluated and a result of the evaluation shows that a pre-set condition is satisfied.

Referring to FIG. 1A, the home automation system that is proposed according to the present invention includes the network part 100b. More specifically, the network part 100b includes a local server, a local gateway, a heterogeneous network gateway, a data converter, and the like.

Referring to FIG. 1A, the home automation system that is proposed according to the present invention includes the client part 100c. More specifically, the client part 100c includes at least one mobile terminal. The mobile terminal will be described in detail below referring to FIGS. 1B to 1D.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Reference is now made to FIGS. 1B-1D, where FIG. 1B is a block diagram of a mobile terminal in accordance with the present disclosure, and FIGS. 1C and 1D are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1B, or activating application programs stored in the memory 170. As one example, the controller 180 controls some or all of the components according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1B, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium Referring now to FIGS. 1C and 1D, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1C and 1D depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1C illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 1E:
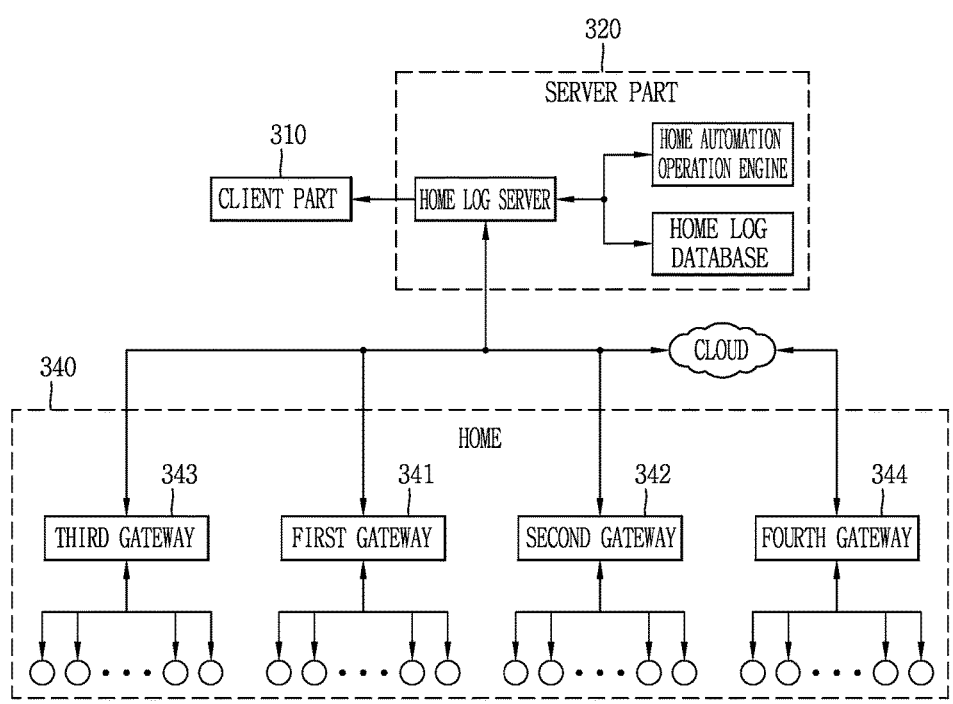
FIG. 1E is a diagram for describing a network configuration of the home automation system that is illustrated in FIG. 1A.

FIG. 1E is a diagram for describing an embodiment of a method of controlling a network in the home automation system that is illustrated in FIG. 1A.

As illustrated in FIG. 1E, the home automation system includes a client part 310, a server part 320, and a local area part 340.

In addition, the server part 320 includes at least one among a home log server, a home automation operation engine, and a home log database.

In addition, the local area part 340 includes at least one among first to fourth gateways 341, 342, 343, and 344. In addition, the local area part 340 includes at least one gateway and at least one electronic apparatus that performs data communication.

More specifically, the first and second gateways use the same communication protocols as does the home log server. In addition, the third gateway uses different protocols from those that are used by the home log server.

Furthermore, the fourth gateway transfers data to a cloud server that is an external database.

On the other hand, the server part 320 is included in the network part 100b that is illustrated in FIG. 1A. In addition, the local area part 340 is included in the device part 100a that is illustrated in FIG. 1A.

A mobile terminal that is configured in this manner and embodiments of a method of controlling the mobile terminal will be described below referring to the accompanying drawings. It is apparent to a person of ordinary skill in the art that different specific embodiments of the present invention can be produced within the range that does not depart from the nature and gist of the present invention and from the essential features of the present invention.

The present invention relates to a mobile terminal that controls operation control information relating to driving of an electronic apparatus that is included in a home automation system and a method of controlling the mobile terminal.

The present invention may be implemented in an launcher application that is necessarily executed to boot the mobile terminal and to perform functions of the mobile terminal, and may be in a controller 180 itself of the terminal.

In a case where the present invention is implemented in the launcher application, the launcher application is an application that is set as a basic program when the mobile terminal is shipped from the factory, or is an application that is installed on the mobile terminal by user's selection.

In a case where the launcher application is installed by the user's selection, the user can download an application using a wireless communication unit. At this point, the user can use a Web site from which to download an application. This Web site is called an application market.

On the other hand, in a case where a launcher application is installed on the mobile terminal by the user's selection and is executed, the launcher application that, when shipped from the factory, was installed on the mobile terminal is no longer executed. This is done to prevent a collision between the two launcher applications.

In addition, in a case where multiple launcher applications are installed, the user can select which of the multiple launcher applications is executed.

A case where the controller 180 of the mobile terminal operates will be described below, but the present invention can be implemented in the same manner, using the launcher application.

FIG. 2 is a flowchart for describing a method of controlling a mobile terminal according to one embodiment of the present invention.

In addition, FIG. 3 is a diagram for describing a screen information of an application for setting operation command information for controlling an electronic apparatus that is included in the home automation system, which is provided in the control method that will be described referring to FIG. 2.

First, referring to FIG. 2, an execution screen of an application for controlling at least one electronic apparatus that is included in the home automation system is output to a display unit 151 (S310).

In this context, referring to FIG. 3, an execution screen 300*a* of the application for controlling at least one electronic apparatus that is included in the home automation system is output to the display unit 151.

More specifically, the execution screen 300*a* that is output includes control command information relating to driving of at least one electronic apparatus that is included in the home automation system, and operation command information that includes condition information corresponding to a condition that is set for the control command information.

In this case, an "operation command," or the "operation command information" is information relating to the driving of at least one electronic apparatus that is included in the home automation system. More specifically, the operation command includes a "control command" relating to the driving of the electronic apparatus, and "condition information that corresponds to at least one condition relating to execution of the control command.

That is, the controller 180 determines whether or not a condition corresponding to the condition information is satisfied, based on the condition information that is included in the operation command. In a case where the condition is satisfied, in order to cause a specific electronic apparatus to perform a specific function, the controller 180 transfers a control signal to the specific electronic apparatus, based on the control command that is included in the operation command.

In this case, the condition information may be information that relates to driving of a specific electronic apparatus, and may be information that relates to surrounding environment information of the home automation system. For example, the surrounding environment information is among pieces of information relating to a temperature at a specific position, humidity, a wind direction, and the like.

In addition, the condition information may be information that relates to status information of a specific mobile terminal that is included in the client part 100*c* of the home automation system.

In addition, the control command may be a command that relates to the driving of a specific electronic apparatus that is included in the home automation system.

For example, a first operation command includes turning-off of the first electric lamp as condition information, and includes turning-on of a second electric lamp as a control command corresponding to the condition information.

That is, when the first operation command that is pre-set by the user is executed, a controller that is included in a specific constituent element of the home automation system determines whether or not the first electric lamp is turned on. Furthermore, in a case where a result of the determination is that the first electric lamp is turned off, a communication unit of the second electric lamp receives a control signal relating to turning-on of the second electric lamp, and a controller of the second electric lamp powers on the second electric lamp, based on the received control signal.

In this context, referring to FIG. 3, the execution screen 300*a* that is output includes first operation command information and second operation command information. In addition, the execution screen 300*a* includes a first region 301 on which condition information of an operation command information is output, and a second region 302 on which control command information of the operation command information.

More specifically, the controller 180 outputs the condition information of the operation command information to the first region 301. In addition, the controller 180 outputs the control command information of the operation command information to the second region 302.

Furthermore, the controller 180 outputs a graphic object 310 relating to a determination target for which the condition information is set, to the first region 301. In addition, the controller 180 outputs a graphic object 320 relating to operation of or a status of the determination target to the first region 301.

In addition, the controller 180 outputs a graphic object 330 relating to an execution target of the control command to the second region 302. In addition, the controller 180 outputs a graphic object 340 relating to operation of the execution target of the control command to the second region 302.

For example, in a case where a first operation command relating to a condition, "When the first electric lamp is turned off, the second electric lamp is turned on," is stored in a memory unit 170, the execution screen 300*a* including the first operation command information is output to the display unit 180. In this case, the controller 180 outputs the graphic object 310 relating to the first electric lamp as a determination target relating to the condition information of the first operation command to the execution screen 300*a*. In addition, the controller 180 outputs the graphic object 320 relating to operation of the first electric lamp.

In addition, the controller 180 outputs the graphic object 320 relating to the second electric lamp as an execution target of a control command relating to the control command of the first operation command to the execution screen 300*a*. In addition, the controller 180 outputs the graphic object 340 relating to operation of the second electric lamp.

Furthermore, based on a user input T that is applied to an addition button image 350 which is output to the execution screen 300*a*, the controller 180 switches the execution screen 300*a* that is output to the display unit 151 to a screen 300*b* for generating a new operation command.

In addition, based on the user input T that is applied to an editing button image 370 or a deletion button image 380 which is output to the execution screen 300*a*, the controller 180 edits or deletes condition information of and control command information of an operation command that is stored in advance.

In addition, based on a user input that is applied to an operation command activation button 360*a* which is output to the execution screen 300*a*, the controller 180 determines whether or not an operation command that is stored in advance is applied to the home automation system.

Next, based on a user input that is applied to the execution screen 300a, the controller 180 generates an operation command with at least one condition that is set, for operation of at least one electronic apparatus (S220).

In this context, referring to FIG. 3, based on the user input T that is applied to the addition button image 350 which is output to the execution screen 300a, the controller 180 generates an operation command with at least one condition that is set, for operation of at least one electronic apparatus.

More specifically, based on the user input T that is applied to the addition button image 350, the controller 180 switches the execution screen 300a that is output to the display unit 151 to the screen 300b for generating a new operation command.

In another example, based on the user input T that is applied to the addition button image 350, the controller 180 outputs a setting window (not illustrated) for generating a new operation command to the execution screen 300a that is output to the display unit 151.

In another example, based on the user input T that is applied to the addition button image 350, the controller 180 outputs an icon (not illustrated) for generating a new operation command to one region of the execution screen 300a that is output to the display unit 151.

In this context, referring to FIG. 3, the controller 180 outputs an icon 310b for adding a target of condition information and an icon 320b for determining information relating to operation of or a status of the added target of the condition information to the screen 300b that results from the switching.

More specifically, based on a user input that is input to the icons 310b and 320b for adding the condition information, the controller 180 recognizes that specific operation of at least one among electronic apparatuses that are included in the home automation system is selected as the condition information.

For example, based on the user input, the controller 180 recognizes that turning-on of a first humidifier is selected as the condition information.

In addition, based on a user input that is input to icons 330b and 340b for adding the control command information, the controller 180 recognizes that specific operation of at least one among electronic apparatuses that are included in the home automation system is selected as the control command information.

For example, based on the user input, the controller 180 recognizes that turning-on of a third electric lamp is selected as the control command information.

Furthermore, based on a user input that is applied to a storage button image 360b that is included in the screen 300b which is output, the controller 180 stores an operation command that is set.

Next, the controller 180 determines whether or not an operation command that is stored in advance in the memory unit 170 and the generated operation command form a loop (S230).

More specifically, based on the condition information and the control command information that are included in the generated operation command, the controller 180 determines whether the stored operation commands form the loop.

In this case, the "loop" means a linkage between multiple operation commands for successive execution. For example, in a case where the first operation command is a command relating to "Turn off the second electric lamp when the first electric lamp is turned on" and a second operation command is a command relating to "Turn on the first electric lamp when the second electric lamp is turned off," the controller 180 determines that the first and second operation commands form the loop mutually.

Figure 4:
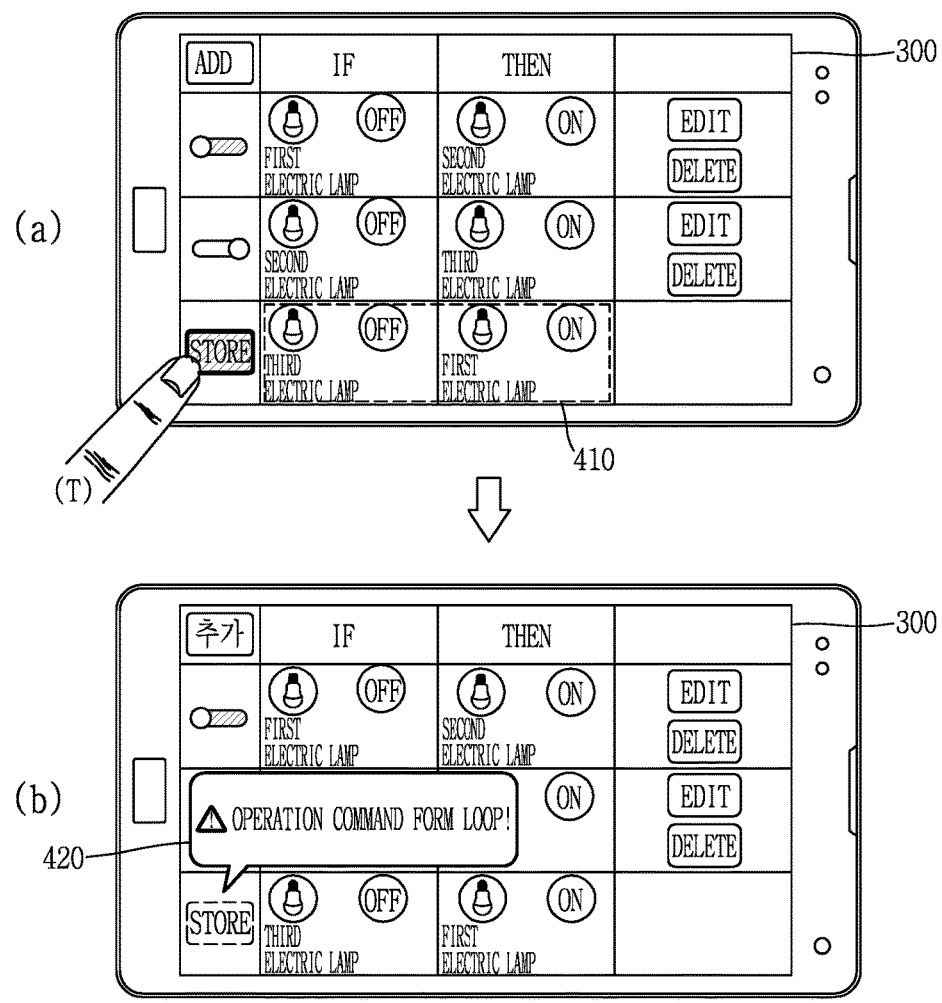
FIG. 4 is diagram for describing a method of controlling a mobile terminal in a case where an operation command that is generated and an operation command that is stored in advance form a loop.

In this context, referring to FIG. 4, an execution screen 300 of the application for controlling at least one electronic apparatus that is included in the home automation system is output to the display unit 151. The execution screen 300 includes the first operation command information and the second operation command information. For example, the first operation command relates to a command relating to "Turn on the second electric lamp when the first electric lamp is turned off," and the second operation command relates to a command relating to "Turn off the third electric lamp when the second electric lamp is turned on."

In this case, based on a user input (not illustrated) that is applied to the execution screen 300, the controller 180 generates a third operation command. For example, the third operation command relates to a command relating to "Turn off the first electric lamp when the third electric lamp is turned off."

In this case, the controller 180 determines that the first to third operation commands form the loop.

Next, in a case where a result of determining whether or not the loop is formed (S230) is that multiple operation commands including the generated operation command are formed, the controller 180 compares multiple pieces of information of the operation commands that are included in the formed loop, and determines whether or not the generated operation command is stored in the memory unit 170 (S240).

In this context, referring to FIG. 4, based on the user input that is applied to the execution screen 300 generates the third operation command. For example, the third operation command relates to a command relating to "Turn on the first electric lamp when the third electric lamp is turned off."

In this case, the controller 180 determines that the first to third operation commands form the loop.

More specifically, the controller 180 compares the first to third operation commands that are included in the formed loop. For example, the controller 180 compares the operation commands that are included in the loop which are formed by the first to third operation commands.

Furthermore, as a result of the comparison, in a case where the operation commands that are included in the loop include multiple pieces of information relating to the driving of the same electronic apparatus, which are incompatible with one another, the controller 180 does not allow the generated operation command to be stored.

For example, in a case where the operation commands that form the loop includes control command information relating to "Turn on the first electric lamp," and condition information relating to "when the first electric lamp is turned off," at the same time, the controller 180 does not the generated operation command to be stored because the operation commands include the two pieces of information relating to the driving of the first electric lamp, which are incompatible with each other.

In addition, although not illustrated in FIGS. 4A to 4C, the controller 180 compares pieces of control command information of multiple operation commands that are included in the formed loop, and thus determines whether the generated operation command is stored.

In another example, the first to third operation command are stored in the memory unit 170. Specifically, the first operation command relates to a command relating to "Turn on the second electric lamp when the first electric lamp is turned off," the second operation command relates to a command relating to "Turn off the third electric lamp when the second electric lamp is turned on," and the operation command relates to a command relating to "Turn off the first electric lamp when the second electric lamp is turned off." The controller 180 determines the stored first to third operation commands do not form the loop mutually.

In this case, by the user input that is applied to the execution screen 300, the controller 180 generates a fourth operation command. For example, the fourth operation command relates to a command relating to "Turn off the second electric lamp when the third electric lamp is turned off."

When the fourth operation command is generated, the controller 180 determines the first to fourth operation commands form the loop mutually. In this case, in the formed loop, the first operation command, the second operation command, the third operation command, and the fourth operation command are linked in this order.

In addition, the controller 180 compares pieces of control command information that are included in multiple operation commands which are included in the formed loop. Furthermore, based on a result of the comparison, the controller 180 determines whether or not the generated operation command is stored.

More specifically, the controller 180 compares multiple pieces of control command information that are included in a loop which are formed by the first to fourth operation commands. In a case where a result of the comparison is that multiple pieces of control command information relating to the driving of the same electronic apparatus, which are incompatible with one another, are included in the loop, the controller 180 does not the generated operation command to be stored.

For example, control command information relating to "Turn on the second electric lamp," and control command information relating to "Turn off the second electric lamp" are included in the loop that is formed by the first to fourth operation commands, and thus the controller 180 compares pieces of information of the control commands that are included in the loop and does not allow the generated operation command information to be stored.

In this case, referring to FIG. 4B, in a case where the controller 180 determines that the generated operation command and operation command that is stored in advance form a loop, compares pieces of information of the control commands that are included in the formed loop, and then does not allow the generated operation command to be stored, the controller 180 changes an exterior appearance of the storage button image that is included in the execution screen 300. For example, in the case where the generated operation command is not allowed to be stored, the controller 180 changes shade of and a color of the storage button image.

In addition, when the user input is applied to the storage button image, the controller 180 outputs an alert window 420 that alerts a user that the generated operation command is not allowed to be stored is output on the execution screen 300. For example, the alert window 420 includes text information meaning "Do you form a loop?"

Various embodiments in which then controller 180 does not allow the generated operation command to be stored will be described below referring to FIGS. 5A, 5B, and 6.

Figure 5:
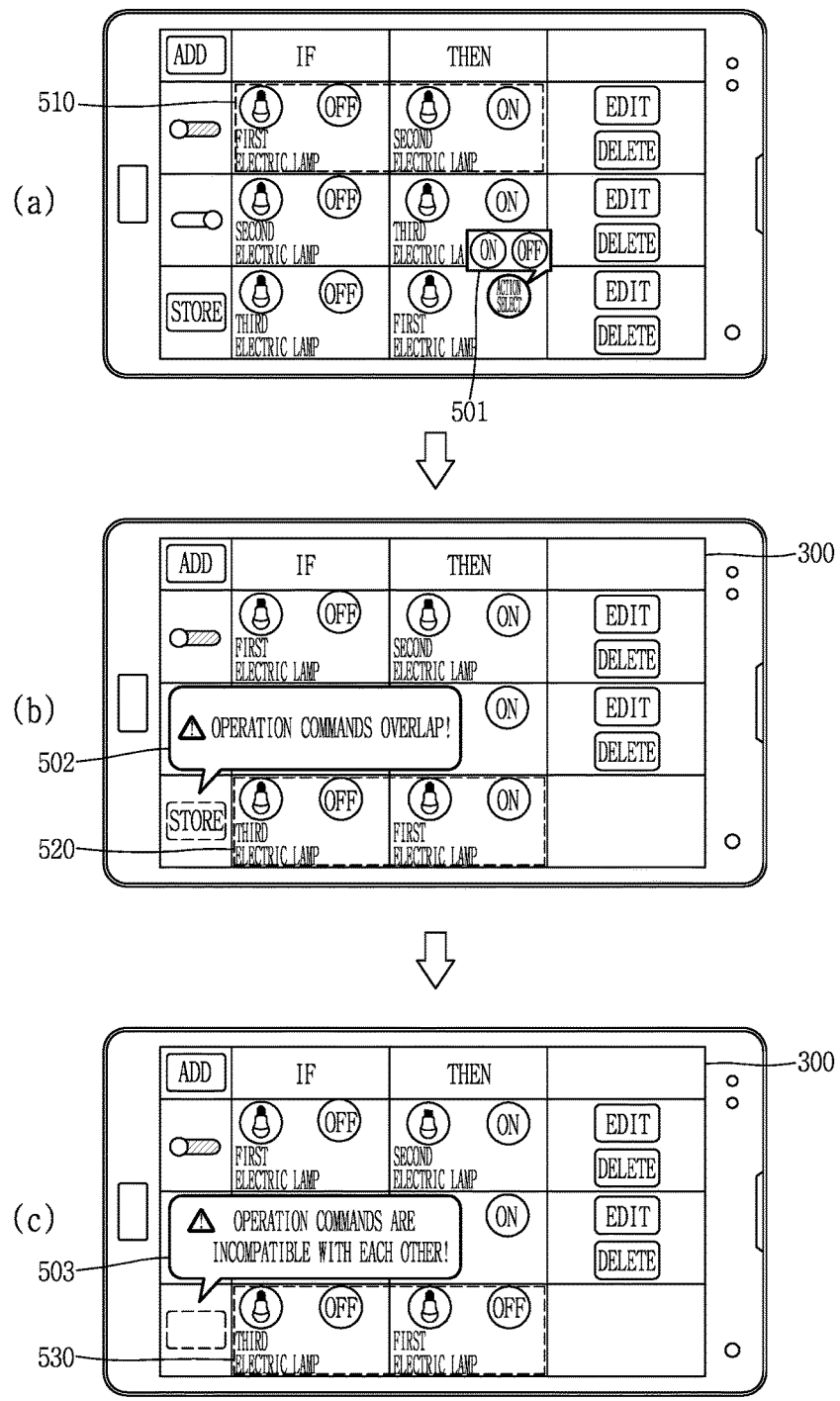
FIG. 5 is diagram for describing the method of controlling the mobile terminal in a case where the generated operation commanded and the operation command that is stored in advance overlap or are incompatible with each other.

Referring to FIG. 5, the execution screen 300 including the first operation command information is output to the display unit 151. For example, the first operation command information is information relating to "Turn on the second electric lamp when the first electric lamp is turned off."

In addition, with the user input (not illustrated) that is applied to the execution screen 300, the controller 180 generates the second operation command.

More specifically, based on a user input that is applied to a setting window 501 for generating an operation command, which is output to one region of the execution screen 300, the controller 180 generates the second operation command. For example, the user inputs include a touch input and the like.

Referring to FIG. 5, based on the user input, the controller 180 generates the second operation command information relating to "Turn on the second electric lamp when the first electric lamp is turned off." In addition, the controller 180 compares the generated second operation command information and the first operation command information that is stored in advance.

In addition, in a case where any one of the generated operation command and the stored operation command is the same, the controller 180 does not allow the generated operation command to be stored.

More specifically, in a case where the first operation command information and the second operation command information are compared with each other and, as illustrated in FIG. 5, it is determined that the first operation command information and the second operation command information are the same, the controller 180 does not allow the generated second operation command to be stored.

In this case, the controller 180 changes the exterior appearance of the storage button image that is included in the execution screen 300. In addition, in a case where a user input is applied to the storage button image, the controller 180 outputs an alert image 502 that alerts the user that the generated operation command is not allowed to be stored. For example, the alert image 502 includes text information meaning "The operation commands overlap."

In addition, in a case where a condition that is set for the generated operation command and a condition for any one of the stored operation commands are the same, and control commands that correspond to the conditions, respectively, are incompatible with each other, the controller 180 does not allow the generated operation command to be stored.

More specifically, referring to FIG. 5, the generated second operation command information is information relating to "Turn off the second electric lamp when the first electric lamp is turned off." In this case, when the first operation command information and the second operation command information are compared with each other and, as illustrated in FIG. 5, the first operation command information and the second operation command information include the same condition information, the controller 180 determines that control commands which correspond to the pieces of condition information, respectively, are incompatible with each other. In addition, based on a result of the determination, the controller 180 does not allow the generated second operation command to be stored.

In this case, the controller 180 changes the exterior appearance of the storage button image that is included in the execution screen 300. In addition, in the case where a user input is applied to the storage button image, the controller 180 outputs the alert image 503 that alerts the user that the generated operation command is not allowed to be stored. For example, the alert image 502 includes text information meaning "The operation commands are incompatible with each other."

In addition, in a case where a condition that is set for the generated operation command and an operation that corresponds to the condition are incompatible with each other, the controller 180 does not allow the generated operation command to be stored.

Figure 6:
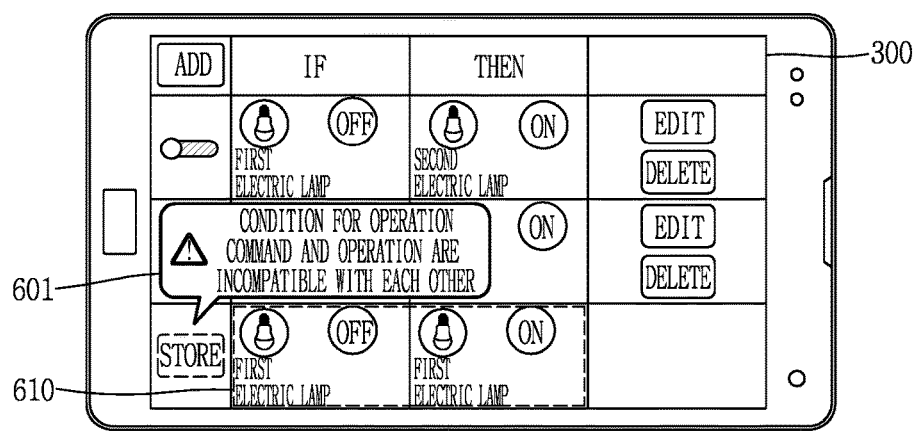
FIG. 6 is a diagram for describing the method of controlling the mobile terminal in a case where a condition of the generated operation command and an operation corresponding to the condition are incompatible with each other.

More specifically, referring to FIG. 6, the generated second operation command information 610 is information relating to "Turn on the first electric lamp when the first electric lamp is turned off."

In this case, the controller 180 analyzes the second operation command information and, as illustrated in FIG. 6, determines that condition information and a control command which are included in the second operation command information are incompatible with each other. In addition, based on a result of the determination, the controller 180 does not allow the generated second operation command to be stored.

In this case, the controller 180 changes the exterior appearance of the storage button image that is included in the execution screen 300. In addition, in the case where a user input is applied to the storage button image, the controller 180 outputs an alert image 601 that alerts the user that the generated operation command is not allowed to be stored. For example, the alert image 601 includes text information meaning "The condition and operation of the operation command are incompatible with each other."

FIG. 7 is diagram for describing the method of controlling the mobile terminal in which, in a case where the generated operation command is stored, the generated operation command is compared with the operation command that is stored in advance, and condition information is added to the generated operation command.

As illustrated in FIG. 7, based on a user input that is applied to the execution screen 300, the controller 180 generates a second operation command information 720. In addition, the execution screen 300 includes a first operation command information 710 that is stored in advance in the memory unit 170.

Referring to FIG. 7, the first operation command information 710 is information relating to "Turn on the first electric lamp when the first user enters the house and the first door is closed." In addition, the second operation command information 720 is information relating to "Turn off the first electric lamp when the first door is closed."

In this case, the controller 180 compares the generated second operation command information and the first operation command information that is stored in advance. Although a result of the comparison is that the first operation command information and the second operation command information include the same condition information and pieces of control command information which correspond to the first operation command information and the second operation command information, respectively, are incompatible with each other, in a case where the first operation command information further includes condition information that is not included in the second operation command information, the generated second operation command information is stored.

That is, referring to FIG. 7, the first operation command information 710 includes first condition information relating to "the first user enters the house," and second condition information relating to "the first door is closed." In addition, the second operation command information 720 includes condition information corresponding to the second condition information, but does not include the first condition information. In this case, the controller 180 stores the generated second operation command information 720.

In this context, referring to FIG. 7, in a case where the second operation command information 720 is stored, the controller 180 determines condition information that is added to the second operation command, based on condition information of a first storage command information that is stored in advance.

More specifically, the condition information that is added to the second operation command is condition information that is contrary to the condition information that is not included in the second operation command, among pieces of condition information of the first storage command information.

For example, as illustrated in FIG. 7, based on a user input that is applied to the execution screen 300, the controller 180 generates the second operation command information 720. In addition, the controller 180 stores the second operation command information. In this case, the controller 180 adds condition information 730 that is contrary to the condition information that is not included in the second operation command information, to the second operation command information, among pieces of condition information of the first operation command information 710 that are stored in advance.

Figure 8:
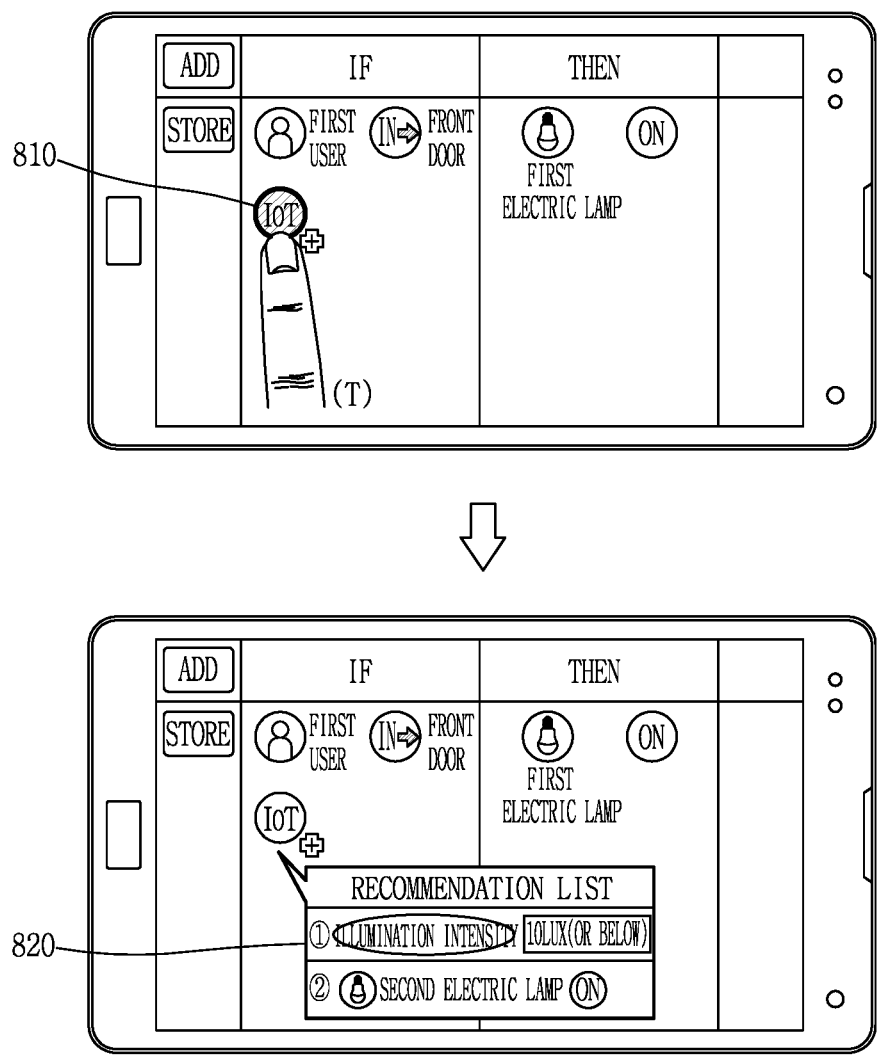
FIG. 8 is diagram for describing the method of controlling the mobile terminal, in which, in a case where an operation command is generated based on a use input that is applied to the execution screen in FIG. 3, condition information is recommended.

FIG. 8 is diagram for describing the method of controlling the mobile terminal, in which, in a case where an operation command is generated based on a user input that is applied to the execution screen in FIG. 3, condition information is recommended.

In this context, based on a control command that corresponds to condition information that is included in the generated operation command, in order to recommend at least one additional condition for the generated operation command, the controller 180 outputs information relating to the additional condition.

More specifically, referring to FIG. 8, based on a user input (not illustrated), the controller 180 generates operation command information relating to "Turn on the first electric lamp when the first user enters the house." In this case, based on control command information relating to "Turn on the first electric lamp," of the generated operation command information, in order to recommend at least one additional condition for the generated operation command, the controller 180 outputs information relating to the additional condition.

For example, referring to FIG. 8, the controller 180 outputs an icon 810 for inputting an addition condition. Based on a user input that is applied to the icon 810, the controller 180 additionally receives status information input relating to the driving of an electronic apparatus that is included in the home automation system, an operation that is performed by the user of the system, or a surrounding sound of the system, as the condition information.

In addition, referring to FIG. 8, based on a user input that is applied to the icon 810, the controller 180 outputs a window 829 that includes at least one piece of information relating to an recommendation condition item, to one region of the execution screen 300.

More specifically, based on control command information of the generated operation command, the controller 180 determines at least one piece of information relating the recommendation condition item. For example, in a case where the control command information of the generated operation command is information relating to "Turn on the first electric lamp," the controller 180 recommends at least one piece of condition information relating to the first electric lamp, based on a recommendation information table that is pre-set.

For example, the controller 180 outputs the window 820 that includes at least one piece of information among condition information relating to "Turn on the second electric lamp," and condition information relating to "illumination intensity at a specific place is equal to or less than 10 Lux," as condition information relating to the first electric lamp.

In addition, although not illustrated in FIG. 8, based on log information of the home automation system, which is stored in advance in the memory unit 170, the controller 180 recommends information relating to an operation command.

Furthermore, although not illustrated in FIG. 8, based on log information of a different home automation system, which is stored in an external database, the controller 180 recommends the information relating to the operation command.

For example, the information relating to the operation command is at least one among predetermined condition information and predetermined control command information.

In a mobile terminal according to one embodiment of the present invention and a method of controlling the mobile terminal, pieces of operation command information for multiple electronic apparatuses that are included in the home automation system are set at user's discretion. Accordingly, user's intention is positively reflected in managing the home automation system.

In addition, with a configuration in which it is determined whether or not operation command information which is generated by a user selection, an error in managing the home automation system is prevented. Thus, stability of the system is improved.

Figure 9:
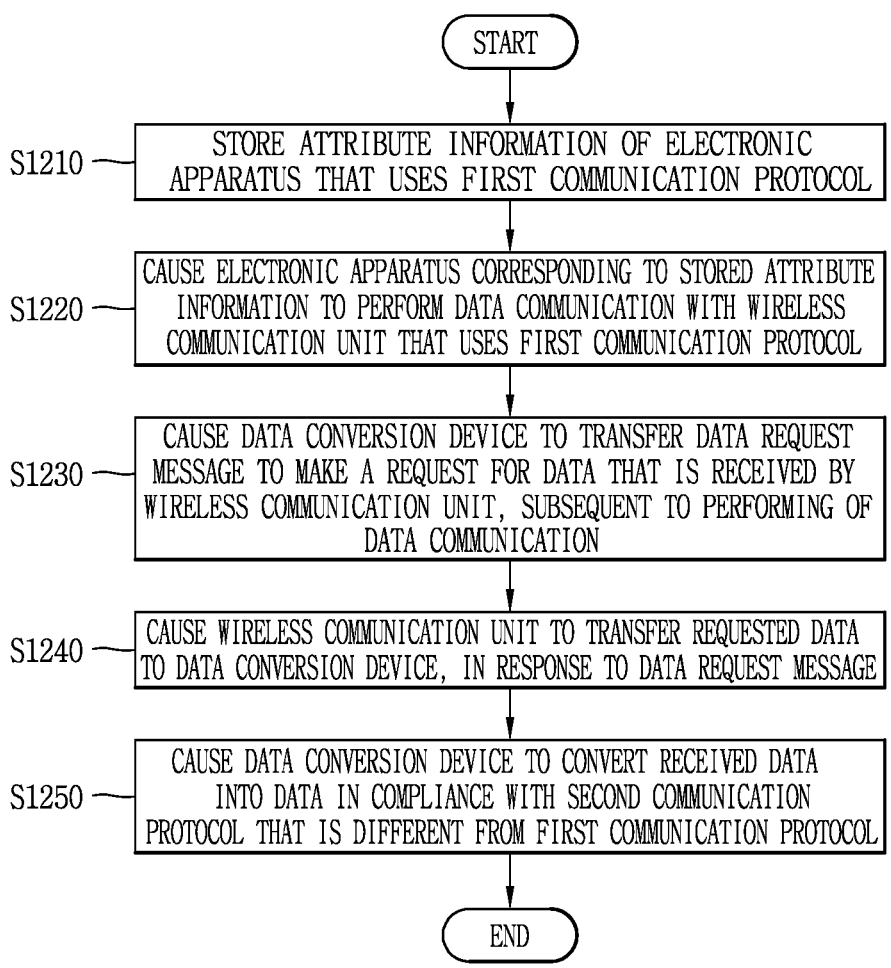
FIG. 9 is a flowchart for describing a method of controlling a home automation system according to one embodiment of the present invention.

FIG. 9 is a flowchart for describing the method of controlling a home automation system according to one embodiment of the present invention.

Referring to FIG. 9, in a method of controlling the home automation system that is proposed according to the present invention, Step S210 of storing attribute information of at least one electronic apparatus that uses first a communication protocol is performed.

In this case, the first communication protocol is different from a second communication protocol that is used by a local gateway of the network part 100*b*.

In addition, attribute information of at least one electronic apparatus that uses the first communication protocol is stored in a memory unit of a heterogeneous protocol gateway that is included in the network part 100*b*. In addition, at least one electronic apparatus that uses the first communication protocol may not perform direct data communication with a local gateway that uses the second communication protocol.

Next, in the control method, Step S220 is performed in which an electronic apparatus corresponding to the stored attribute information performs data communication with a wireless communication unit that uses the first communication protocol.

More specifically, the wireless communication unit is a heterogeneous protocol gateway that uses the first communication protocol.

In addition, the heterogeneous protocol gateway that uses the first communication protocol performs data communication with the electronic apparatus, and thus receives predetermined data and transfers the received data to an external database. For example, the external database is a cloud server.

On the other hand, in a case where data communication with an electronic apparatus that uses the first communication protocol is performed, the heterogeneous protocol gateway transfers a signal that alerts a data conversion data that the data communication is performed using a data conversion device to the data conversion data.

Next, in the control method, subsequent to Step S220 of communicating the data, Step S230 of the data conversion device transferring a data request message making a request for the data that is received by the wireless communication unit is performed.

More specifically, after receiving from the heterogeneous protocol gateway the signal that the heterogeneous protocol gateway performs the data communication with at least one electronic apparatus, the data conversion device transfers the data request message making a request for the data that is received by the heterogeneous protocol gateway, as a response, to the heterogeneous protocol gateway.

In another example, in a case where the heterogeneous protocol gateway transfers the received data to an external database, the data conversion device transfers the data request message to the external database.

Next, in the control method, in response to the data request message, the wireless communication unit performs Step S240 of transferring the requested data to the data conversion device.

More specifically, when receiving then data request message, the heterogeneous protocol gateway transfers the data that is received by performing the data communication with at least one electronic apparatus, to the data conversion device.

In another example, in a case where the data conversion device transfers the data request message to the external database, a controller of the external database transfers the data that is received from the heterogeneous protocol gateway, to the data conversion device.

In addition, in the control method, the data conversion device performs Step S250 of converting the transferred data into data in compliance with the second communication protocol that is different from the first communication protocol.

More specifically, the data conversion device stores conversion information that is pre-set, in such a manner that the data in compliance with a heterogeneous protocol is converted.

In addition, based on the conversion information that is stored in advance, the data conversion device converts the transferred data in compliance with the first communication protocol into data in compliance with the second communication that is different from the first communication protocol.

In this case, the second communication protocol is used by a local gateway that is included in the network part 100*b* of the home automation system.

On the other hand, the gateway transfers the data that results from the conversion by the data conversion device, to a local server of the network part 100*b*.

Furthermore, as illustrated in FIGS. 2 and 9, an execution screen of an application for controlling at least one electronic apparatus that uses a different communication protocol is output to the display unit 151 of the mobile terminal that is included in the client part 100*c* of the home automation system. In addition, a controller generates an operation command for which at least one condition for a control command relating to the driving of at least one electronic apparatus that use a different communication protocol is set. In this case, the controller determines whether or not the stored operation command and the generated operation command form a loop. Then, in a case where a result of the determination is that multiple operation commands including the generated operation command form the loop, the controller compares pieces of information relating to control commands of the multiple operation commands that are included in the formed loop and determines whether or not the generated operation command is stored in the memory unit 170. In the home automation system that uses the operation command, in a case where, when performing data communication with respect to the stored operation command, an electronic apparatus corresponding to the stored operation command uses a different communication protocol than does the system, as illustrated in FIG. 9, Step S210 of storing attribute information of the electronic apparatus, Step S220 of performing the data communication, Step S230 of transferring the data request message, Step S240 of transferring the requested data, and Step S250 of performing the conversion are performed.

A method of performing data communication in the home automation system will be described below referring to FIGS. 10 to 11B.

Referring to FIGS. 10 and 10B, the data conversion device is arranged within a first gateway 341 that uses the same communication protocol as does a local server (a home log server).

In addition, the data conversion device that is arranged within the first gateway 341 performs data communication with a third gateway 343 that uses a communication protocol different from the communication protocol that is used by the local server.

More specifically, referring to FIG. 10A, an integration gateway 420 that uses the second communication protocol which is used by the home log server (the local server) performs data communication with a heterogeneous protocol gateway 422 that uses the first communication protocol different from the second communication protocol.

In addition, referring to FIGS. 10 and 10B, the heterogeneous protocol gateway 422 transfers data that is received from at least one electronic apparatus 440 that uses the first communication protocol, to a data conversion device 421 that is arranged within the integration gateway 420.

More specifically, the data conversion device 421 performs data communication with the heterogeneous protocol gateway, using an application that is provided by the heterogeneous protocol gateway.

For example, the application may be in the form of a software development kit (DSK), be in the form of a library, or be in the form of an HTTP protocol.

As illustrated in FIG. 10A, the data conversion device 421 re-sets identification information of an electronic apparatus, which is included in the received data. In addition, the data conversion device 421 analyzes the received data, and structuralizes the received data in such a manner that the received data is structuralized to be compatible with the second communication protocol. Furthermore, the data conversion device 421 sets local identification information (a home ID) of the data that results from the conversion and that will be used in the local server.

On the other hand, the integration gateway 420 performs data communication with at least one electronic apparatus that uses the second communication protocol, using communication technologies, such as WiFi, Bluetooth, Zigbee, and Z-wave.

Referring to FIGS. 11A and 11B, the data conversion device performs data communication between an external database that uses the first communication protocol and a wireless communication unit that uses the second communication protocol.

More specifically, a data conversion device 520 performs data communication between a home log server (a local server) 530 and a cloud server 510.

For example, the data conversion device 520 makes a request for data that is stored in the cloud server, using a cloud open API. The open API is RESTful or is an IDE type.

On the other hand, a position at which the data conversion device 520 is arranged is determined by a service type that is provided by a cloud server.

For example, in a case where the cloud server provides an IDE type service, the data conversion device 520 is arranged within the cloud server.

In another example, in a case where the cloud server provides a RESTful service, the data conversion device 520 is arranged within the home log server.

More specifically, referring to FIG. 11, the data conversion device 520 performs data communication with an external database 510 that uses the first communication protocol that is different from the second communication protocol.

In addition, referring to FIG. 11, the external database 510 performs data communication with a heterogeneous protocol gateway that uses the first communication protocol.

As illustrated in FIG. 11, the data conversion device 520 re-sets identification information of an electronic apparatus that is included in the received data. In addition, the data conversion device 520 analyzes the received data, and structuralizes the received data in such a manner that the received data is structuralized to be compatible with the second communication protocol. Furthermore, the data conversion device 520 sets local identification information (a home ID) of the data that results from the conversion and that will be used in the local server.

In this case, attributes of an identification information that results from the re-setting and of the local identification information are strings. In addition, the data conversion device 520 structuralizes the received data, using JavaScript Object Notation (JSON).

A control method relating to data processing in the home log server that receives the data that results from the conversion will be described below referring to FIG. 12.

Figure 12:
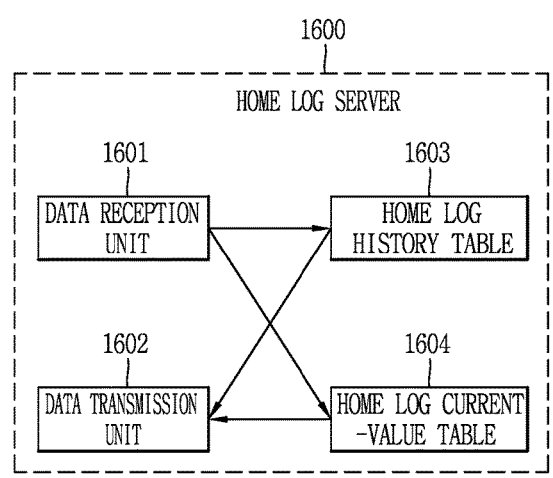
FIG. 12 is a diagram for describing a configuration a home log server that is included in a server unit of the home automation system.

Referring to FIG. 12, a home log server 600 includes at least one among a data reception unit 601, a data transmission unit 602, a log history table 603, and a home log current-value table 604.

More specifically, at least one among log information relating to data communication between constituent elements that are included in the home automation system and log information relating to operations that are performed by the constituent elements is stored in the home log history table 603.

In addition, information relating to a current status of each of the constituent elements that are included in the home automation system is stored in the home log current-value table 604.

Therefore, in the method of controlling the home automation system, a step of transferring the data that results from the conversion to the local server (the home log server) is performed.

In addition, in the control method, a step of storing the log information of the home automation system based on the data that results from the conversion and that is transferred to the local server and editing the status information of the system is performed.

In a mobile terminal according to one embodiment of the present invention and a method of controlling the mobile terminal, pieces of operation command information for multiple electronic apparatuses that are included in the home automation system are set at user's discretion. Accordingly, user's intention is positively reflected in managing the home automation system.

In addition, with a configuration in which it is determined whether or not operation command information which is generated by a user selection, an error in managing the home automation system is prevented. Thus, stability of the system is improved.

In a home automation system according to one embodiment of the present invention and a method of controlling the home automation system, the data communication with an electronic apparatus that uses various network protocols is performed. Accordingly, the network compatibility of the home automation system is improved.

Therefore, a network attribute of an electronic apparatus does not impose any limitation in using the home automation system. Thus, user convenience is increased.

The present invention is implemented in various industrial fields that use a home automation apparatus which uses the Internet of Things and a home automation system which include this home automation apparatus.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

The invention claimed is:

1. A mobile terminal comprising: a display unit configured to output an execution screen of an application for controlling at least one electronic apparatus; a memory unit configured to store at least one of operation command information related with the electronic apparatus; and a controller configured to generate an operation command for which at least one condition for a control command related with driving of the electronic apparatus is set, based on a user input applied to the execution screen, wherein the controller determines whether or not the stored operation command and the generated operation command form a loop, and wherein, the controller determines whether or not the generated operation command is to be stored in the memory unit by comparing information related with control commands of a plurality of operation commands included in the formed loop when the plurality of operation commands including the generated operation command form the loop.

2. The mobile terminal of claim 1, wherein the controller does not allow the generated operation command to be stored, when the generated operation command and one of the stored operation command are same.

3. The mobile terminal of claim 1, wherein the controller does not allow the generated operation command to be stored, when the condition set for the generated operation command and a control command corresponding to the condition are incompatible with each other.

4. The mobile terminal of claim 1, wherein the controller does not allow the generated operation command to be stored, when the condition set for the generated operation command and one of condition for the stored operation commands are the same and control commands that correspond to the conditions, respectively, are incompatible with each other.

5. The mobile terminal of claim 1, wherein the controller outputs information relating to an additional condition in order to recommend at least one additional condition for the generated operation command, based on a control command that corresponds to the condition set for the generated operation command.

6. The mobile terminal of claim 1, wherein the memory unit stores a log information related with driving of at least one electronic apparatus is stored in the memory unit, and
wherein the controller outputs information related with the condition or the control command in order to recommend at least one condition or a control command for the generated operation command, based on the stored log information.

7. The mobile terminal of claim 1, further comprising a wireless communication unit,
wherein the controller determines whether or not the condition set for the stored operation command is satisfied, and
wherein the controller controls the wireless communication unit to transfer a control signal for controlling the driving of the electronic apparatus to the electronic apparatus when the condition set for the stored operation command is satisfied, based on a control command that is included in the stored operation command and that corresponds to the condition set for the stored operation command.

8. The mobile terminal of claim 7,
wherein the controller controls the display unit to output a first graphic object related with a determination target for which the condition set for the stored operation command determined as be satisfied, and a second graphic object related with an operation of or a status of the determination target.

9. The mobile terminal of claim 1, wherein the condition comprises:
a condition related with driving of the electronic apparatus,
a condition related with an environment of a place at which the electronic apparatus is arranged,
a condition related with status information of a specific terminal.

10. The mobile terminal of claim 1,
wherein the controller determines whether or not the stored operation command is activated based on a touch input that is applied to the execution screen.

11. A method of controlling a mobile terminal, comprising: outputting an execution screen of an application for controlling at least one electronic apparatus; storing at least one of operation command information related with the electronic apparatus; generating an operation command for which at least one condition for a control command related with driving of the electronic apparatus is set, based on a user input that is applied to the execution screen; determining whether or not the stored operation command and the generated operation command form a loop; and determining whether or not the generated operation command is to be stored in a memory unit by comparing information related with control commands of a plurality of operation commands included in the formed loop when the plurality of operation commands including the generated operation command form the loop.

12. The method of claim 11, wherein, in the determining of whether or not the generated operation command is stored in a memory unit, the generated operation command is not allowed to be stored, in a case where a condition that is set for the generation operation command and a control command corresponding to the condition are incompatible with each other.

13. The method of claim 11, wherein, in the determining of whether or not the generated operation command is stored in a memory unit, the generated operation command is not allowed to be stored, in a case where a condition that is set for the generated operation command and a condition for any one of the stored operation commands are the same, and control commands that correspond to the conditions, respectively, are incompatible with each other.

14. The method of claim 11, further comprising: outputting information relating to an additional condition in order to recommend the at least one additional condition for the generated operation command, based on a control command that corresponds to a condition that is set for the generated operation command.

\* \* \* \* \*